United States Patent
Chun et al.

(10) Patent No.: US 9,930,701 B2
(45) Date of Patent: *Mar. 27, 2018

(54) METHOD FOR A USER TERMINAL TO RANDOM ACCESS A CARRIER AGGREGATION MOBILE COMMUNICATION SYSTEM

(71) Applicant: LG ELECTRONICS INC., Seoul (KR)

(72) Inventors: Sung Duck Chun, Anyang-si (KR); Sung Hoon Jung, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,860

(22) Filed: Mar. 9, 2017

(65) Prior Publication Data

US 2017/0181196 A1 Jun. 22, 2017

Related U.S. Application Data

(63) Continuation of application No. 14/453,083, filed on Aug. 6, 2014, now Pat. No. 9,629,184, which is a (Continued)

(51) Int. Cl.
*H04W 74/08* (2009.01)
*H04W 72/14* (2009.01)
*H04L 29/06* (2006.01)

(52) U.S. Cl.
CPC ......... *H04W 74/0833* (2013.01); *H04L 69/28* (2013.01); *H04W 72/14* (2013.01)

(58) Field of Classification Search
CPC .......... H04W 74/0833; H04W 72/042; H04W 72/14; H04L 69/28
See application file for complete search history.

(56) References Cited

U.S. PATENT DOCUMENTS

2005/0141473 A1 6/2005 Lim et al.
2007/0121546 A1 5/2007 Zuckerman et al.
(Continued)

FOREIGN PATENT DOCUMENTS

CN 101448325 6/2009
JP 2010-098716 4/2010
(Continued)

OTHER PUBLICATIONS

Samsung, "Initial random access in asymmetric carrier aggregation," 3GPP TSG RAN WG1 Meeting #55bis, R1-090093, Jan. 2009, 3 pages.
(Continued)

*Primary Examiner* — Ian N Moore
*Assistant Examiner* — Justin T. Van Roie
(74) *Attorney, Agent, or Firm* — Lee Hong Degerman Kang Waimey

(57) ABSTRACT

A method for random access to a base station by a user equipment (UE) in a mobile communication system using carrier aggregation in which communication is conducted over a plurality of component carriers, and a terminal for the method are disclosed. When the UE performs a contention-based random access procedure in the mobile communication system to which CA technology is applied, the UE considers an uplink grant signal as a contention resolution message when receiving the uplink grant signal from a eNB only when the uplink grant signal is received through a downlink CC corresponding to an uplink CC used to trans-
(Continued)

mit a random access preamble or a third message, to thereby prevent contention resolution from being erroneously ended.

13 Claims, 9 Drawing Sheets

Related U.S. Application Data continuation of application No. 13/376,588, filed as application No. PCT/KR2010/003629 on Jun. 7, 2010, now Pat. No. 8,861,460.

(60) Provisional application No. 61/184,833, filed on Jun. 7, 2009, provisional application No. 61/219,366, filed on Jun. 22, 2009.

(56) References Cited

U.S. PATENT DOCUMENTS

| | | |
|---|---|---|
| 2007/0214247 A1 | 9/2007 | Yang et al. |
| 2008/0037413 A1 | 2/2008 | Gu et al. |
| 2008/0310396 A1 | 12/2008 | Park et al. |
| 2009/0232058 A1 | 9/2009 | Lee et al. |
| 2010/0027438 A1 | 2/2010 | Cai |
| 2010/0034162 A1 | 2/2010 | Ou et al. |
| 2010/0111032 A1 | 5/2010 | Wu |
| 2010/0124188 A1 | 5/2010 | Wu |
| 2010/0197315 A1 | 8/2010 | Lindstrom et al. |
| 2010/0227569 A1 | 9/2010 | Bala et al. |
| 2010/0322118 A1 | 12/2010 | Fang et al. |
| 2011/0075629 A1 | 3/2011 | Seo et al. |
| 2011/0235609 A1 | 9/2011 | Ahn et al. |
| 2011/0317552 A1 | 12/2011 | Lee et al. |
| 2012/0113926 A1 | 5/2012 | Ou et al. |
| 2014/0362803 A1 | 12/2014 | Chun et al. |

FOREIGN PATENT DOCUMENTS

| | | |
|---|---|---|
| KR | 1020050066860 | 6/2005 |
| KR | 1020080014421 | 2/2008 |
| KR | 1020090028401 | 3/2009 |

OTHER PUBLICATIONS

ZTE, "Initial Uplink Access Procedure in LTE-Advanced," 3GPP TSG RAN WG1 Meeting #55bis, R1-090076, Jan. 2009, 4 pages.
State Intellectual Property Office of the People's Republic of China Application Serial No. 201080025252.X, Office Action dated Nov. 29, 2013, 8 pages.
NTT DoCoMo, "Initial Access Procedure for Asymmetric Wider Bandwidth in LTE-Advanced," 3GPP TSG RAN WG1 Meeting #54bis, R1-083680, Sep. 2008, 5 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.5.0, Mar. 2009, 7 pages.
Ericsson, "Carrier aggregation in LTE-Advanced," TSG-RAN WG1 #53bis, R1-082468, Jun. 2008, 6 pages.
European Patent Office Application Serial No. 10786330.0, Search Report dated Jul. 22, 2015, 7 pages.
Korean Intellectual Property Office Application No. 10-2011-7026687, Notice of Allowance dated Dec. 27, 2016, 2 pages.
LG Electronics, "Initial Access Procedure in LTE-Advanced", R1-091209, 3GPP TSG RAN WG1 Meeting #56bis, Mar. 2009, 4 pages.
Samsung, "Initial random access in asymmetric carrier aggregation", R1-091881, 3GPP TSG RAN WG1 #57, May 2009, 5 pages.
CATT, "Initial Random Access Procedure for LTE-A", R1-091527, 3GPP TSG RAN WG1 meeting #56bis, Mar. 2009, 5 pages.
ZTE, "On DL Component Carrier Ambiguity in Initial Random Access Procedure", R1-091700, 3GPP TSG RAN WG1 Meeting #57, May 2009, 8 pages.
Intellectual Property Office of India Application No. 8763/CHENP/2011, Office Action dated Aug. 24, 2017, 7 pages.

METHOD FOR A USER TERMINAL TO RANDOM ACCESS A CARRIER AGGREGATION MOBILE COMMUNICATION SYSTEM

CROSS-REFERENCE TO RELATED APPLICATIONS

This application is a continuation of U.S. patent application Ser. No. 14/453,083, filed on Aug. 6, 2014, now U.S. Pat. No. 9,629,184, which is a continuation of U.S. patent application Ser. No. 13/376,588, filed on Dec. 6, 2011, now U.S. Pat. No. 8,861,460, which is the National Stage filing under 35 U.S.C. 371 of International Application No. PCT/KR2010/003629, filed on Jun. 7, 2010, which claims the benefit of U.S. Provisional Application No. 61/219,366, filed on Jun. 22, 2009, and 61/184,833, filed on Jun. 7, 2009, the contents of which are all hereby incorporated by reference herein in their entirety.

TECHNICAL FIELD

The following description relates to a method for random access to a base station by a user equipment (UE) in a mobile communication system using carrier aggregation in which communication is conducted over a plurality of component carriers, and a terminal for the method.

BACKGROUND ART

A brief Long Term Evolution (LTE) is a mobile communication system evolved from Universal Mobile Telecommunications System (UMTS), standardized by an international standardization organization, the $3^{rd}$ Generation Partnership Project (3GPP). The configuration of an LTE system is illustrated in FIG. 1.

FIG. 1 is a view referred to for describing the configuration of an LTE system.

The LTE system may be divided largely into an Evolved UMTS Terrestrial Radio Access Network (E-UTRA) and an Evolved Packet Core (EPC). The E-UTRAN includes UEs and evolved Node Bs (eNBs). A UE is connected to an eNB via a Uu interface and one eNB is connected to another eNB via an X2 interface. The EPC includes a Mobility Management Entity (MME) responsible for control-plane functions and a Serving GateWay (S-GW) responsible for user-plane functions. An eNB is connected to the MME via an S1-MME interface and an eNB is connected to the S-GW via an S1-U interface. These two interfaces are collectively called an S1 interface.

For the Uu interface being an air interface, a radio interface protocol is defined. The radio interface protocol horizontally includes a physical layer, a data link layer, and a network layer and vertically includes a user-plane (U-plane) for user data transmission and a control-plane (C-plane) for control signaling. Based on the lowest three layers of the Open System Interconnection (OSI) reference model, this radio interface protocol can be divided into Layer 1 (L1) including a physical layer PHY, Layer 2 (L2) including a Medium Access Control/Radio Link Control/Packet Data Convergence Protocol (MAC/RLC/PDCP) layer, and Layer 3 (L3) including a Radio Resource Control (RRC) layer. These layers are defined in pairs between a UE and an E-UTRAN, for data transmission via the Uu interface.

Now a description will be given below of a Long-Term Evolution Advanced (LTE-A) system.

LTE-A is a system developed from LTE to meet $4^{th}$ Generation mobile communication requirements, that is, IMT-Advanced requirements recommended by the International Telecommunication Union-Radio communication sector (ITU-R). The 3GPP which developed the LTE system standard is now actively working on standardization of the LTE-A system.

Major technologies added to the LTE-A system are carrier aggregation for extending a used bandwidth and flexibly using the bandwidth and use of relays for improving coverage, supporting group mobility and enabling user-centered network deployment.

FIGS. 2 and 3 are views referred to for describing radio protocol layers.

At L1, the PHY layer provides information transfer service to a higher layer on physical channels. The PHY layer is connected to the MAC layer through transport channels and data is transferred between the MAC layer and the PHY layer on the transport channels. The transport channels are largely divided into dedicated transport channels and common transport channels depending on whether the transport channels are shared or not. Data is transmitted on physical channels using radio resources between different PHY layers, that is, the PHY layers of a transmitter and a receiver.

There is a plurality of layers at L2. The MAC layer maps logical channels to transport channels and performs logical channel multiplexing by mapping a plurality of logical channels to one transport channel. The MAC layer is connected to a higher layer, namely the RLC layer, through logical channels. Depending on the types of information carried on the logical channels, the logical channels are classified into control channels that deliver C-plane information and traffic channels that deliver U-plane information.

The RLC layer at L2 adjusts a data size to be suitable for data transmission in the air interface from a lower layer by segmenting and concatenating data received from a higher layer. In order to guarantee various Quality of Service (QoS) requirements of each Radio Bearer (RB), the RLC layer provides three operation modes, Transparent Mode (TM), Unacknowledged Mode (UM), and Acknowledged Mode (AM). Especially, an AM RLC performs a retransmission function through Automatic Repeat and Request (ARQ), for reliable data transmission.

The PDCP layer at L2 compresses a header to reduce the size of an Internet Protocol (IP) packet header of a relatively large size containing unnecessary control information to efficiently transmit an IP packet such as an IPv4 or IPv6 packet via a radio link having a narrow bandwidth. The header compression function enables transmission of necessary information in a header only, thereby increasing the transmission efficiency of a radio link. In addition, the PDCH layer performs a security function in the LTE system. This security function involves ciphering for preventing a third party from eavesdropping and integrity protection for preventing a third party from maliciously modifying data.

The RRC layer at the highest of L3 is defined only in the C-plane. The RRC layer takes charge of controlling logical channels, transport channels, and physical channels in relation to configuration, reconfiguration, and release of Radio Bearers (RBs). An RB is a logical path provided by L1 and L2 in the radio protocol architecture, for data transmission between a UE and a UTRAN. In general, configuring an RB means defining the features of a radio protocol layer and channels needed to provide a specific service and setting specific parameters and an operation scheme. RBs are classified into a Signaling RB (SRB) and Data RB (DRB). The SRB is used as a path via which an RRC message is transmitted on the C-plane and the DRB is used as a path in which user data is transmitted on the U-plane.

Now a description will be given of Carrier Aggregation (CA) in the LTE-A system.

FIG. 4 is a view referred to for describing CA.

As described above, the LTE-A standard is designed as an IMT-Advanced candidate technology of the ITU to satisfy IMT-Advanced technical requirements. Accordingly, extension of a bandwidth from the legacy LTE system is under discussion to satisfy IMT-Advanced technical requirements. For bandwidth extension, carriers available to the legacy LTE system are defined as Component Carriers (CCs) in the LTE-A system. Aggregation of up to 5 CCs is under discussion, as illustrated in FIG. 4. Because a CC may occupy up to 20 MHz as in the LTE system, the CA technology of the LTE-A standard is a concept of extending a bandwidth to up to 100 MHz. The technology of aggregating a plurality of CCs is called CA.

Hereinbelow, a random access procedure performed in the LTE system will be described in greater detail.

In the LTE system, a UE may perform the random access procedure, when the UE initially accesses an eNB without an RRC connection having been established therebetween, when the UE initially accesses a target cell during handover, when the random access procedure is requested by a command from the eNB, upon generation of uplink data in a situation in which uplink time synchronization has not been acquired or specified radio resources for use in requesting radio resources have not been allocated, or when radio link failure or handover failure is recovered.

Based on the above description, a general contention-based random access procedure will be described below.

FIG. 5 is a diagram illustrating a signal flow for operations of a UE and an eNB in a contention-based random access procedure.

(1) Transmission of First Message

The UE may select a random access preamble randomly from a random preamble set indicated by system information or a handover command, select Physical Random Access CHannel (PRACH) resources, and transmit the random access preamble through selected Physical PRACH (PRACH) resources (S501).

(2) Reception of Second Message

After transmitting the random access preamble in step S501, the UE attempts to receive a random access response within a random access response reception window indicated through the system information or the handover command by the eNB (S502). To be more specific, the random access response may be transmitted in the form of a Medium Access Control Protocol Data Unit (MAC PDU) and the MAC PDU may be delivered over a Physical Downlink Shared CHannel (PDSCH). To receive information on the PDSCH successfully, the UE preferably monitors a Physical Downlink Control CHannel (PDCCH). That is, the PDCCH preferably carries information about a UE to receive the PDSCH, information about the frequency and time of radio resources of the PDSCH, and information about the transmission format of the PDSCH. Once the UE succeeds in receiving the PDCCH destined therefor, the UE may successfully receive a random access response over the PDSCH according to information carried over the PDCCH. The random access response may include an identifier (ID) of the random access preamble (e.g. a Random Access Preamble ID (RAPID)), an Uplink (UL) Grant indicating uplink radio resources, a temporary Cell-Radio Network Temporary Identify (C-RNTI), and a Timing Advance Command (TAC).

The reason for including the RAPID in the random access response is that because one random access response may contain random access response information for one or more UEs, it is necessary to indicate a UE to which the UL Grant, the temporary C-RNTI, and the TAC are valid. It is assumed in step S502 that the ID of the random access preamble is identical to the RAPID included in the random access response. Thus, the UE may receive the UL Grant, the temporary C-RNTI, and the TAC.

(3) Transmission of Third Message

Upon receipt of a valid random access response, the UE processes information included in the random access response. That is, the UE applies the TAC and stores the temporary C-RNTI. In addition, the UE may store data to be transmitted in a message3 buffer in correspondence with the reception of a valid random access response.

Meanwhile, the UE transmits data (i.e. a third message) to the eNB using the received UL Grant (S503). The third message should include an ID of the UE. In the contention-based random access procedure, the eNB cannot identify UEs that perform the random access procedure. However, the eNB should identify the UEs to avoid later-collision among them.

Two methods have been discussed to include the ID of the UE in the third message. One of the methods is that if the UE has a valid C-RNTI allocated by the cell before the random access procedure, the UE transmits its C-RNTI in an uplink signal corresponding to the UL Grant. On the other hand, if a valid C-RNTI has not been allocated to the UE before the random access procedure, the UE transmits its UE ID (e.g. S-TMSI or a random ID) in data. In general, the UE ID is longer than the C-RNTI. If the UE transmits data corresponding to the UL Grant, the UE activates a Contention Resolution (CR) timer to avoid contention.

(4) Reception of Fourth Message

After transmitting its ID in data according to the UL Grant included in the random access response, the UE awaits reception of a command for contention resolution from the eNB. That is, the UE attempts to receive a PDCCH in order to receive a specific message (S504). For PDCCH reception, two methods may be considered. When the third message is transmitted using the C-RNTI according to the UL Grant as described above, the UE attempts to receive a PDCCH using the C-RNTI. If the ID included in the third message is the UE ID, the UE may attempt to receive a PDCCH using the temporary C-RNTI included in the random access preamble. In the former case, if the UE receives a PDCCH using the C-RNTI before expiration of the CR timer, the UE ends the random access procedure, determining that the random access procedure has been performed normally. In the latter case, if the UE receives a PDCCH using the temporary C-RNTI before expiration of the CR timer, the UE checks data received on a PDSCH indicated by the PDCCH. If the data includes its UE ID, the UE ends the random access procedure, determining that the random access procedure has been performed normally.

Meanwhile, a contention free random access procedure is ended only by transmitting first and second messages, which is different from the contention-based random access procedure shown in FIG. 5. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

DISCLOSURE

Technical Problem

When the UE attempts to perform contention-based random access to the eNB in the LTE system, a contention resolution procedure may be erroneously ended due to confusion between an uplink grant for transmission of a corresponding Buffer Status Report (BSR) and uplink grant for transmission of another Buffer Status Report (BSR). Although this problem is an extremely unusual case, if the above-described CA technology is applied to the LTE-A system, the probability of generation of erroneous completion of contention resolution due to confusion between uplink grant information about a corresponding CC and uplink grant information about other CCs is increased.

Accordingly, a description will be given of a method for performing random access at a UE without the above-mentioned confusion in a mobile communication system to which the CA is applied, and a UE configured to perform the method.

Technical Solution

The object of the present invention can be achieved by providing a method for performing a random access procedure by a User Equipment (UE) for an eNB in a mobile communication system using carrier aggregation in which communication is conducted using a plurality of component carriers, the method including: transmitting a random access preamble to the eNB through a first uplink component carrier (hereinafter referred to as 'UL CC') from among a plurality of UL CCs; receiving a random access response message including first uplink (UL) grant information as a response to the random access preamble through a first downlink component carrier (hereinafter referred to as 'DL CC') corresponding to the first UL CC; transmitting a third message including identity information of the UE to the eNB through an uplink radio resource corresponding to the first UL grant information in the first UL CC; and receiving second UL grant information from the eNB, wherein the UE considers the contention resolution procedure according to transmission of the third message as a successful procedure only when the second UL grant information is received through the first DL CC.

The UE may not consider the second UL grant information PDCCH as the contention resolution message according to transmission of the third message when the second UL grant information is received through a second DL CC different from the first DL CC.

The UE may include a physical layer module and a Medium Access Control (MAC) module, and the MAC layer module may determine whether the contention resolution procedure according to transmission of the third message is successful or not only when the physical layer module reports reception of a Physical Downlink Control Channel (PDCCH) through the first DL CC to the MAC layer module.

The identity information of the UE may be a C-RNTI MAC control element which indicates C-RNTI of the UE. When PDCCH including the second UL grant information is received through the first DL CC and indicates the C-RNTI of the UE, the UE may consider the contention resolution procedure according to transmission of the third message as a successful procedure.

The identity information of the UE may be a UE contention resolution identity MAC control element which includes an identifier other than the C-RNTI of the UE. When the PDCCH including the second UL grant information is received through the first DL CC and indicates temporary C-RNTI of the UE and a PDSCH corresponding to the PDCCH includes the UE contention resolution MAC control element, the UE may consider the contention resolution procedure according to transmission of the third message as a successful procedure.

The UE may consider whether the PDCCH is received through the first DL CC or not in order to determine whether the contention resolution procedure according to transmission of the third message is successful only when the UE transmits the third message including the C-RNTI MAC control element to the eNB.

The UE may perform a HARQ operation through a second UL CC different from the first UL CC and a second DL CC different from the first DL CC, independently of transmission of the third message and reception of the second UL grant information.

In another aspect of the present invention, provided herein is a UE which performs random access to an eNB in a mobile communication system using carrier aggregation in which communication is conducted using a plurality of component carriers, the UE including: a MAC layer module including a plurality of HARQ entities respectively corresponding to the plurality of component carriers, and configured to control signal transmission using a plurality of uplink component carriers (referred to as 'UL CCs') through the plurality of HARQ entities and signal reception through a plurality of downlink component carriers (referred to as 'DL CCs') respectively corresponding to the plurality of UL CCs; and a processor functionally connected to the MAC layer module and including a physical layer module configured to transmit a signal through the plurality of UL CCs and to receive a signal through the plurality of DL CCs, wherein only when UL grant information is received through a first DL CC corresponding to a first UL CC used to transmit a third message to the eNB from among the plurality of UL CC, the processor considers a contention resolution procedure according to transmission of the third message as a successful procedure.

The processor may be configured such that the processor does not consider UL grant information received through a second DL CC different from the first DL CC as the contention resolution message according to transmission of the third message.

The MAC layer module may be configured to determine whether the contention resolution procedure according to transmission of the third message is successful or not only when the physical layer module reports reception of a PDCCH through the first DL CC to the MAC layer module.

The third message may be identity information of the UE and include a C-RNTI MAC control element which indicates C-RNTI of the UE, and the processor may consider the contention resolution procedure according to transmission of the third message as a successful procedure when PDCCH including the UL grant information is received through the first DL CC and indicates the C-RNTI of the UE.

The third message may be identity information of the UE and include a UE contention resolution identity MAC control element which includes an identifier other than C-RNTI of the UE, and the processor may consider the contention resolution procedure according to transmission of the third message as a successful procedure when the PDCCH including the UL grant information is received through the first DL CC and indicates temporary C-RNTI of the UE, and a PDSCH corresponding to the PDCCH includes the UE contention resolution identity MAC control element.

The processor may consider whether the PDCCH is received through the first DL CC or not in order to determine whether the contention resolution procedure according to transmission of the third message is successful only when the third message including the C-RNTI MAC control element is transmitted to the eNB.

The UE may perform a HARQ operation through a second UL CC different from the first UL CC and a second DL CC different from the first DL CC, independently of transmission of the third message and reception of the UL grant information.

Advantageous Effects

In accordance with embodiments of the present invention as described above, it is possible to prevent a contention resolution procedure from being erroneously ended due to wrong analysis of an uplink grant signal.

BEST MODE FOR CARRYING OUT THE INVENTION

Figure 1:
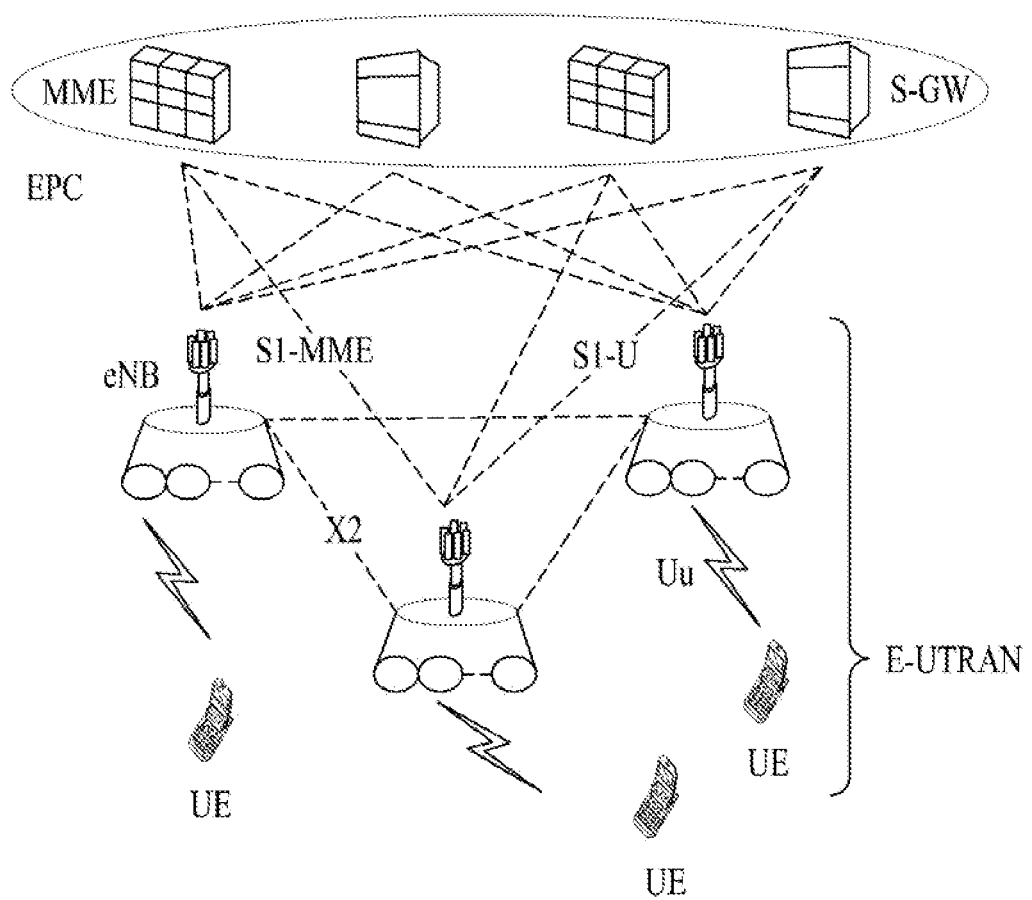
FIG. 1 is a view referred to for describing the configuration of a Long Term Evolution (LTE) system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of the 3GPP LTE series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), etc. In addition, the term Base Station (BS) generically refers to any node at a network end which communicates with a UE, such as a Node B, an eNode B, etc.

A description will be given of a method for performing a random access procedure by a UE for an eNB without confusion in a contention resolution procedure in a mobile communication system to which CA is applied and a UE configured to perform the method. To achieve this, a contention resolution procedure and a scheme for preventing the above-mentioned confusion will be described in more detail.

Contention is generated during a random access procedure because the number of random access preambles is finite. Since an eNB cannot provide random access preambles to respective UEs, a UE selects one of common random access preambles and transmits the selected random access preamble. In this case, while two or more UEs may select the same random access preamble and transmit it through the same PRACH resource, the eNB determines that one random access preamble is transmitted from one UE, and thus transmits a random access response to the one UE and predicts that the one UE will receive the random access response. However, the two or more UEs receive the random access response when contention occurs as described above, and thus they perform operations depending on the random access response. That is, the two or more UEs transmit different data items through the same radio resource using one uplink grant included in the random access response.

Accordingly, all the data items may fail in being transmitted to the eNB, or the eNB may receive only data from a specific UE depending on the location or transmit power of the UE. In the latter case, since the two or more UEs consider that they have succeeded in transmitting their data items, the eNB needs to inform UEs which fail in the contention that they do not succeed in transmitting their data items. Informing UEs of information about success or failure of contention is called contention resolution.

There are two contention resolution methods, a method using a contention resolution (hereinafter referred to as CR) timer and a method of transmitting an identifier of a successful UE to other UEs. The former case is used when a UE previously has its C-RNTI before a random access procedure. Specifically, the UE having its C-RNTI transmits data including the C-RNTI to the eNB in response to a random access response and activates a CR timer. Upon reception of PDCCH information including the C-RNTI before the expiration of the CR timer, the UE determines that it has succeeded in the contention and normally ends the random access procedure. On the contrary, when the UE does not receive the PDCCH information including its C-RNTI before the expiration of the CR timer, the UE determines that it has failed in the contention and re-executes the random access procedure or informs a higher layer of the failure.

The latter case, that is, the method of transmitting an identifier of a successful UE, is used when the UE has no C-RNTI before a random access procedure. Specifically, when the UE has no C-RNTI, the UE includes an identifier higher than the C-RNTI (S-TMSI or random access ID; hereinafter referred to as a UE contention resolution identify MAC control element) in data depending on uplink grant information included in a random access response, transmits the data, and activates a CR timer. Upon reception of data including the S-TMSI through a DL-SCH before the expiration of the CR timer, the UE may determine that the random access procedure is successful. On the contrary, when the UE does not receive the data including the S-TMSI through the DL-SCH, the UE determines that the random access procedure has failed.

Confusion that a UE may experience will be described on the basis of the above-described concept of contention resolution.

Figure 6:
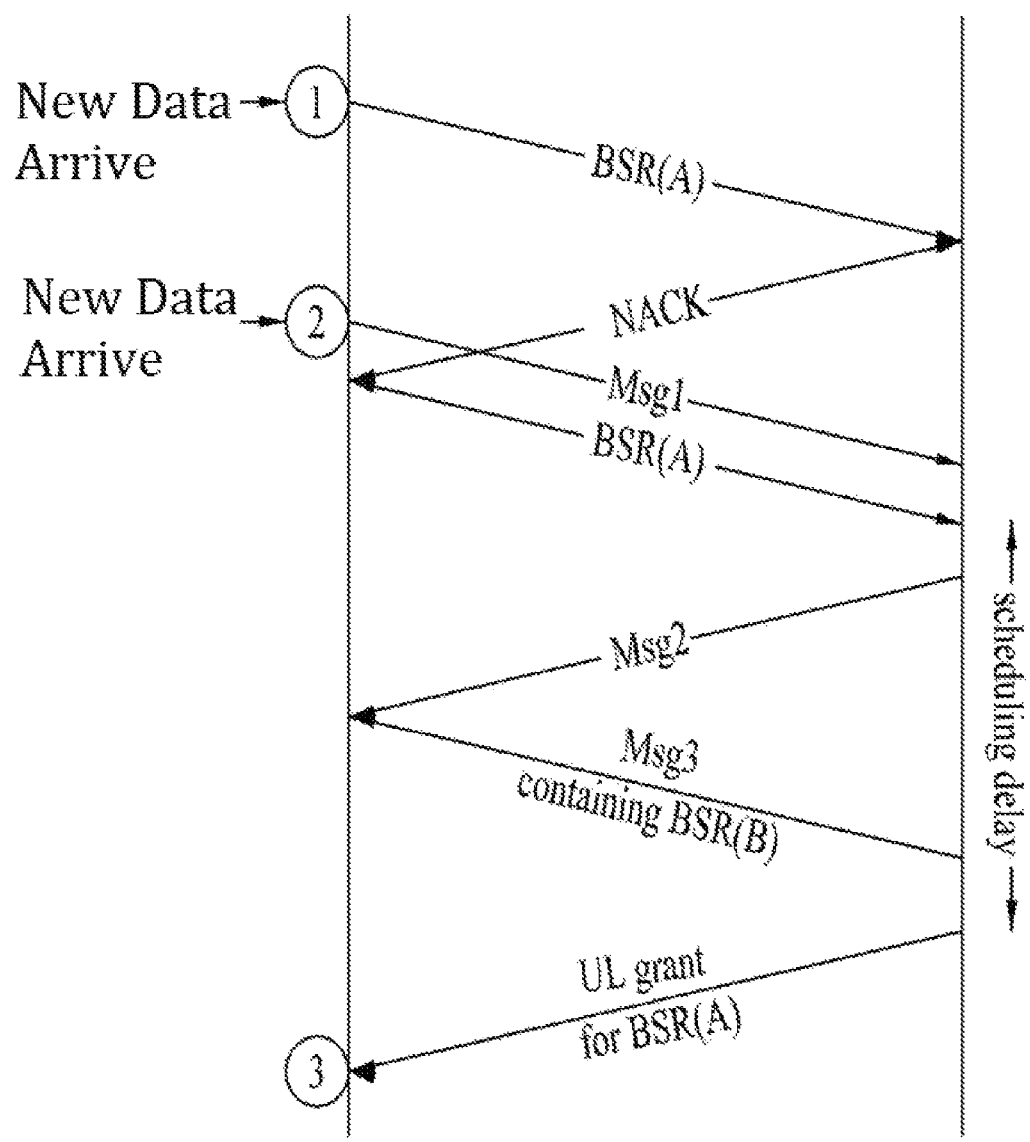
FIG. 6 is a view referred to for describing an example of confusion that a UE may experience during a contention resolution procedure when performing contention-based random access to an eNB.

FIG. 6 is a view referred to for describing an example of confusion that a UE may experience during a contention resolution procedure when performing contention-based random access to an eNB.

The UE may transmit a Buffer Status Report (hereinafter referred to as BSR(A)) to the eNB according to generation of new data in step 1. Here, it is assumed that the UE has an uplink radio resource for transmitting the BSR(A).

In step 2, if data having priority higher than current data stored in a buffer is generated in the UE, the UE needs to transmit another BSR(B) to the eNB in order to report generation of the data to the eNB. At this time, it is assumed that the UE does not have an uplink radio resource for transmitting the BSR(B), that is, the UE performs a contention-based random access procedure to request the eNB to provide the uplink radio resource.

Meanwhile, the eNB cannot determine whether the UE currently performs the random access procedure or not before correctly receiving a third message during the random access procedure. In the example of FIG. 6, if the eNB transmits an uplink grant for the previously received BSR (A) to the UE in a state that the eNB has not correctly received the third message transmitted from the UE, the UE may determine the uplink grant to be a contention resolution message for the random access procedure to transmit the BSR(B) and determine that the random access procedure is successful. Accordingly, the BSR(B) that the UE attempts to transmit may be lost.

Although the LTE system has the problem that a BSR is lost during transmission due to wrong contention resolution illustrated in FIG. 6, this problem is not significant because the frequency of generation is low. In the LTE-A system, however, the frequency of generation of transmission loss of BSR due to wrong contention resolution in a contention-based random access procedure may increase since a UE uses a plurality of UL CCs and DL CCs.

Figure 7:
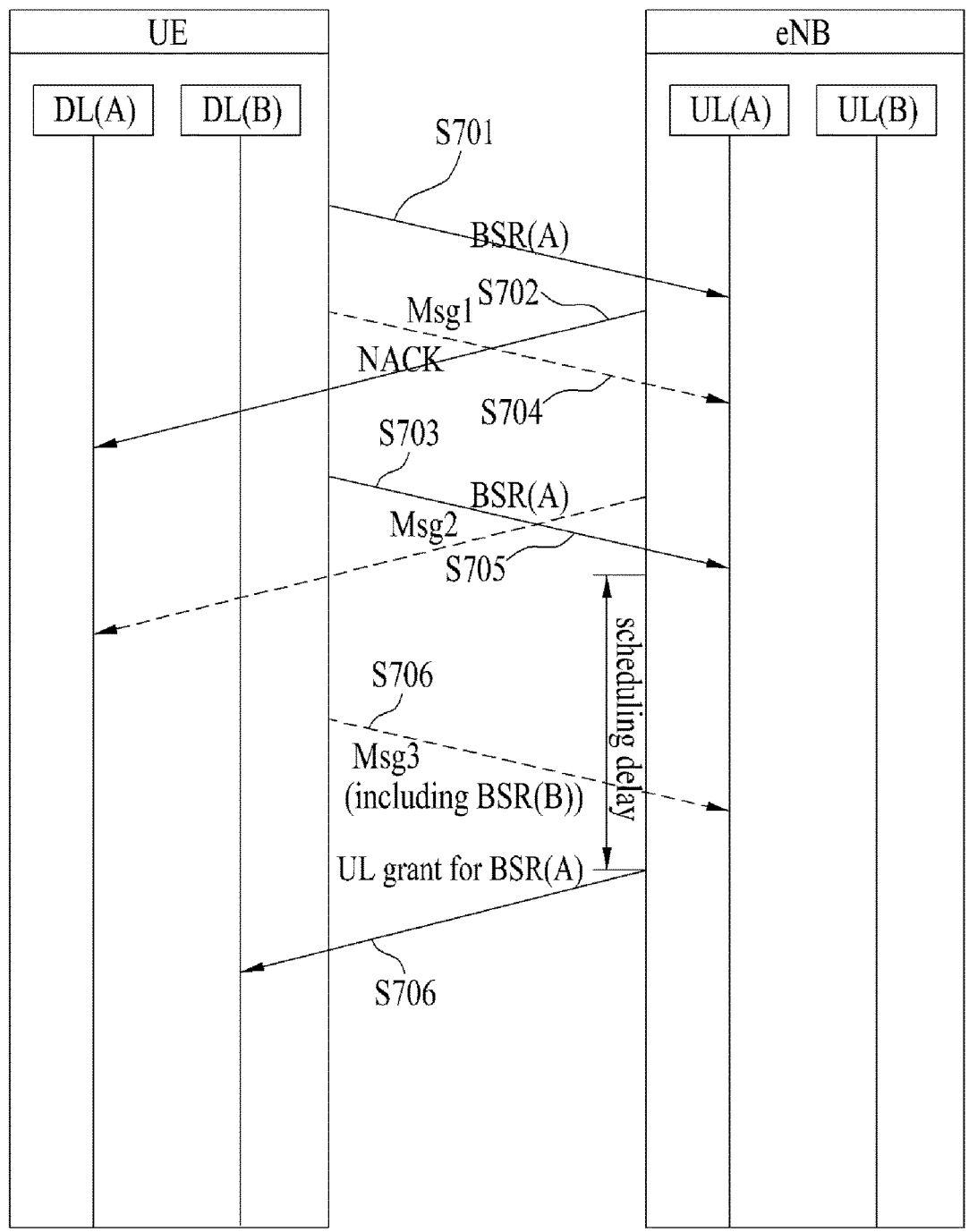
FIG. 7 is a view referred to for describing an example of generation of wrong contention resolution in a contention-based random access procedure in the LTE system.

FIG. 7 is a view referred to for describing an example of generation of wrong contention resolution in a contention-based random access procedure in the LTE system.

In FIG. 7, it is assumed that a UE performs communication using two DL CCs DL(A) and DL(B) and an eNB carries out communication using two UL CCs UL(A) and UL(B), in which UL(A) and DL(A) are connected to each other and UL(B) and DL(B) are connected to each other. The UE can acquire information about available CCs and information about UL CC/DL CC connection through system information received from the eNB.

Referring to FIG. 7, the UE may transmit BSR(A) to the eNB through UL(A) according to generation of new data in step S701. Here, it is assumed that the UE has an uplink radio resource for transmitting the BSR(A). When the eNB transmits a NACK message in response to the BSR(A) transmitted in step S701, the UE may retransmit the BSR(A) (S703).

If data having priority higher than current data stored in a buffer is generated in the UE, the UE needs to transmit another BSR BSR(B) to the eNB in order to report generation of the data to the eNB. However, if the UE does not have an uplink radio resource for transmitting the BSR(B), that is, if the UE performs a contention-based random access procedure through UL(A) to request the eNB to provide the uplink radio resource, the UE may transmit a first message through UL(A) (S704), and the eNB may transmit a second message to the UE through DL(A) in response to the first message. The UE may transmit a third message including its identifier to the eNB through UL(A) using uplink grant information of the received second message (S706).

The eNB cannot determine whether the UE currently performs the random access procedure or not before correctly receiving the third message during the random access procedure. In the example of FIG. 7, if the eNB transmits an uplink grant for the previously received BSR(A) to the UE through DL CC(B) in a state that the eNB has not correctly received the third message transmitted from the eNB (S707), the UE may determine the uplink grant received in step S707 as a contention resolution message for the random access procedure to transmit the BSR(B) and determine that the random access procedure is successful. Accordingly, the BSR(B) that the UE attempts to transmit may be lost.

To prevent confusion of a UE in a system using the CA technology, an embodiment of the present invention determines that contention resolution of a random access procedure is successful only in the case in which the UE receives a contention resolution control signal through a specific DL CC. That is, when the UE does not receive uplink grant information through a DL CC corresponding to an UL CC through which the third message is transmitted, the UE according to the embodiment of the present invention does not consider the corresponding uplink grant signal as an uplink grant signal for a contention resolution procedure.

Figure 8:
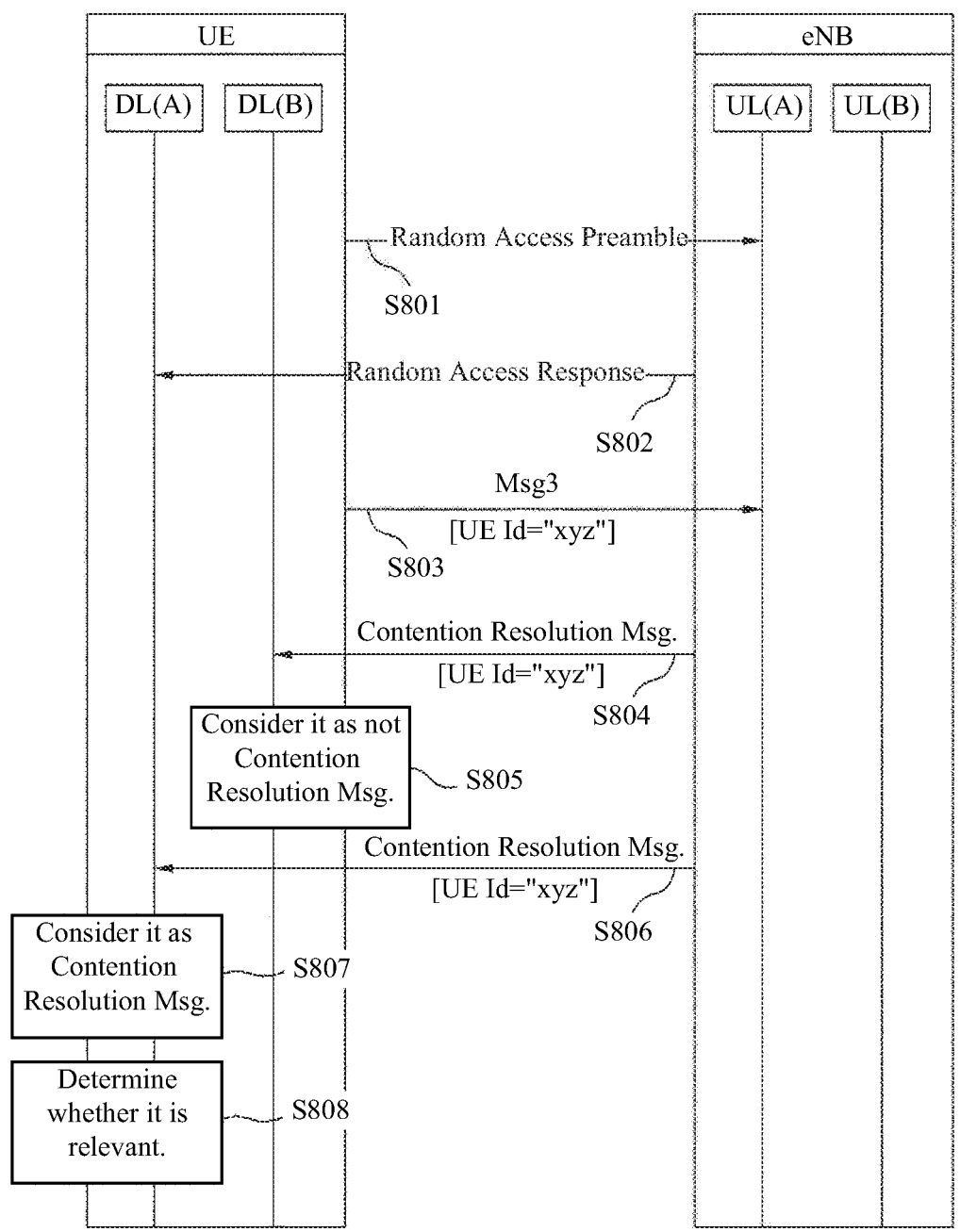
FIG. 8 is a view referred to for describing a method for performing random access to an eNB by a UE according to an embodiment of the present invention.

FIG. 8 is a view referred to for describing a method for performing a random access procedure by a UE for an eNB according to an embodiment of the present invention.

In the example of FIG. 8, it is assumed that the UE is configured to be able to use two UL CCs UL(A) and UL(B) and two DL CCs DL(A) and DL(B) from the eNB for CA, UL(A) and DL(A) are mapped to each other and UL(B) and the DL(B) are mapped to each other, and UL(A) and UL(B) are assigned PRACH resources such that they can be used to perform a random access procedure.

The UE may transmit a random access preamble to the eNB through UL(A) in order to perform a contention-based random access procedure (S801). The eNB may transmit a random access response to the UE through DL(A) mapped to UL(A) in response to the random access preamble (S802). The UE may transmit a third message through UL(A) using uplink grant information included in the random access response (S803). The third message includes the identifier of the UE. The identifier of the UE may be C-RNTI. The identifier of the UE is assumed to be xyz in the embodiment of the present invention.

The UE may receive a contention resolution message including the identifier of the UE, xyz, from the eNB through DL(B) (S804). Specifically, the contention resolution message may include uplink grant information and may be a PDCCH which indicates xyz of the UE. However, it is assumed that the UE according to the embodiment of the present invention considers the PDCCH including the uplink grant information as the contention resolution message only when the PDCCH is received through DL(A) corresponding to UL(A) through which the random access preamble is transmitted or the third message. Accordingly, the UE may not determine the uplink grant information transmitted through DL(B) as the contention resolution message (S805). In this case, the UE continuously attempts to receive the contention resolution message until its CR timer expires.

The UE may receive an uplink grant signal including the identifier of the UE, xyz, through DL(A) from the eNB (S806). Here, it is assumed that the CR timer of the UE has not expired yet. Accordingly, the UE may consider the uplink grant signal as a contention resolution message since the UE determines that the uplink grant signal has been received through DL(A) mapped to UL(A) through which the random access preamble or the third message is transmitted, and determine whether the corresponding identifier is matched (S808). In the embodiment of the present invention, the UE receives the uplink grant information through DL(A) corresponding to UL(A) used to transmit the random access preamble and the third message, and may determine that the random access procedure is successful since it has received the PDCCH which indicates the identifier of the UE, xyz.

As described above with reference to FIG. 8, a received DL CC may be checked to determine whether a received uplink grant signal can be used as a contention resolution message or not only when the UE has its C-RNTI before a random access procedure. When the UE attempts contention resolution using a UE contention resolution identity control element because it does not include its C-RNTI before initiation of the random access procedure, the UE needs to receive a PDCCH which indicates temporary C-RNTI and determine whether the PDSCH corresponding to the PDCCH includes the UE contention resolution identity control element or not. Accordingly, the probability that the UE confuses uplink grant information regarding a corresponding BSR with uplink grant information regarding another BSR, as described with reference to FIG. 7 is very low. The present invention may be configured to consider a DL CC through which a fourth message is transmitted for all contention-based random access procedures.

A description will be given of a detailed configuration for allowing the UE to consider only uplink grant information received through a DL CC corresponding to an UL CC used to transmit a first message/third message as a contention resolution message as described above with reference to FIG. 8.

In general, a contention resolution algorithm in a random access procedure performed in the MAC layer of the UE is as follows.
[Table 1]
In the case in which a lower layer (that is, physical layer) reports reception of a PDCCH to the UE,
(1) when a third message includes a C-RNTI MAC control element (that is, when the UE includes its C-RNTI before initiation of the random access procedure),
    (A) if the random access procedure is a contention-based random access procedure (that is, if the random access procedure is initiated in a MAC sublayer), and the PDCCH indicates the C-RNTI and includes uplink grant information for new transmission, or
    (B) if the random access procedure is a contention free random access procedure (that is, if the random access procedure is initiated by a PDCCH command) and the received PDCCH indicates C-RNTI,
        (a) the UE determines that the contention resolution procedure is successful, and
        (b) stops its CR timer.
(2) In the case in which the third message includes CCCH SDU, the received PDCCH indicates temporary C-RNTI of the UE, and a received MAC PDU has been successful decoded,
    (A) the UE stops its CR timer, and
    (B) when the corresponding MAC PDU includes a UE contention resolution identity control element, and this contention resolution identity control element is matched to the CCCH SDU transmitted through the third message (that is, the contention resolution identity control element corresponds to the identity of the UE, transmitted from the UE),
        (a) the UE considered the contention resolution procedure to be successful, and
        (b) sets the temporary C_RNTI used for the random access as C-RNTI.

In the algorithm as shown in Table 1, the UE may consider a DL CC through which the UE receives an uplink grant signal as follows.
[Table 2]
In the case in which a lower layer (that is, physical layer) reports reception of a PDCCH through a DL CC corresponding to an UL CC used to transmit a random access preamble or a third message to the UE,
(1) when the third message includes a C-RNTI MAC control element (that is, when the UE includes its C-RNTI before initiation of the random access procedure),
    (A) if the random access procedure is a contention-based random access procedure (that is, if the random access procedure is initiated in a MAC sublayer), and the PDCCH indicates the C-RNTI and includes uplink grant information for new transmission, or
    (B) if the random access procedure is a contention free random access procedure (that is, if the random access procedure is initiated by a PDCCH command) and the received PDCCH indicates C-RNTI,
        (a) the UE determines that the contention resolution procedure is successful, and
        (b) stops its CR timer.
(2) In the case in which the third message includes CCCH SDU, the received PDCCH indicates temporary C-RNTI of the UE, and a received MAC PDU has been successful decoded,
    (A) the UE stops its CR timer, and
    (B) when the corresponding MAC PDU includes a UE contention resolution identity control element, and this UE contention resolution identity control element is matched to the CCCH SDU transmitted through the third message (that is, the UE contention resolution identity control element corresponds to the identity of the UE, transmitted from the UE),
        (a) the UE considers the contention resolution procedure to be successful, and
        (b) sets the temporary C_RNTI used for the random access as C-RNTI.

Meanwhile, a description will be given of a scheme of considering a DL CC through which the UE receives an uplink grant signal only in a restricted case in which the UE has its C-RNTI before initiation of a random access procedure according to an embodiment of the present invention and the random access procedure is initiated by the UE, specifically, a MAC sublayer of the UE.
[Table 3]
In the case in which a lower layer (that is, physical layer) reports reception of a PDCCH to the UE, (1) when the third message includes a C-RNTI MAC control element (that is, when the UE includes its C-RNTI before initiation of the random access procedure),
    (A) if the random access procedure is a contention-based random access procedure (that is, if the random access procedure is initiated in the MAC sub-layer), the PDCCH is received through a DL CC corresponding to an UL CC used to transmit a random access preamble or the third message, and the received PDCCH indicates the C-RNTI and includes uplink grant information for new data transmission, or
    (B) if the random access procedure is a contention free random access procedure (that is, if the random access procedure is initiated by a PDCCH command) and the received PDCCH indicates C-RNTI,
        (a) the UE determines that the contention resolution procedure is successful, and
        (b) stops its CR timer.
(2) In the case in which the third message includes CCCH SDU, the received PDCCH indicates temporary C-RNTI of the UE, and a received MAC PDU has been successful decoded,
    (A) the UE stops its CR timer, and
    (B) when the corresponding MAC PDU includes a UE contention resolution identity control element, and this UE contention resolution identity control element is matched to the CCCH SDU transmitted through the third message (that is, the UE contention resolution identity control element corresponds to the identity of the UE, transmitted from the UE),
        (a) the UE considers the contention resolution procedure to be successful, and
        (b) sets the temporary C_RNTI used for the random access as C-RNTI.

Meanwhile, a description will be given of a scheme of considering a DL CC through which the UE receives an uplink grant signal only in a restricted case in which the UE has its C-RNTI before initiation of a random access procedure according to an embodiment of the present invention and the random access procedure is initiated by a command of the eNB, specifically, a PDCCH command.

[Table 4]
In the case in which a lower layer (that is, physical layer) reports reception of a PDCCH to the UE,
(1) when the third message includes a C-RNTI MAC control element (that is, when the UE includes its C-RNTI before initiation of the random access procedure),
    (A) if the random access procedure is a contention-based random access procedure (that is, if the random access procedure is initiated in a MAC sublayer), and the PDCCH indicates the C-RNTI and includes uplink grant information for new data transmission, or
    (B) if the random access procedure is a contention free random access procedure (that is, if the random access procedure is initiated by a PDCCH command), the PDCCH is received through a DL CC corresponding to an UL CC used to transmit a random access preamble or a third message, and the received PDCCH indicates the C-RNTI,
        (a) the UE determines that the contention resolution procedure is successful, and
        (b) stops its CR timer.
(2) In the case in which the third message includes CCCH SDU, the received PDCCH indicates temporary C-RNTI of the UE, and a received MAC PDU has been successful decoded,
    (A) the UE stops its CR timer, and
    (B) when the corresponding MAC PDU includes a UE contention resolution identity control element, and this UE contention resolution identity control element is matched to the CCCH SDU transmitted through the third message (that is, the UE contention resolution identity control element corresponds to the identity of the UE, transmitted from the UE),
        (a) the UE considers the contention resolution procedure to be successful, and
        (b) sets the temporary C_RNTI used for the random access as C-RNTI.

Meanwhile, the following algorithm may be used when the UE considers a DL CC through which an uplink grant signal is received only which the UE does not have its C-RNTI before initiation of a random access procedure.

[Table 5]
In the case in which a lower layer (that is, physical layer) reports reception of a PDCCH to the UE,
(1) when a third message includes a C-RNTI MAC control element (that is, when the UE includes its C-RNTI before initiation of the random access procedure),
    (A) if the random access procedure is a contention-based random access procedure (that is, if the random access procedure is initiated in a MAC sublayer), and the PDCCH indicates the C-RNTI and includes uplink grant information for new data transmission, or
    (B) if the random access procedure is a contention free random access procedure (that is, if the random access procedure is initiated by a PDCCH command) and the received PDCCH indicates C-RNTI,
        (a) the UE determines that the contention resolution procedure is successful, and
        (b) stops its CR timer.
(2) In the case in which the third message includes CCCH SDU, the received PDCCH indicates temporary C-RNTI of the UE, and a received MAC PDU has been successful decoded,
    (A) the UE stops its CR timer, and
    (B) when the PDCCH is received through a DL CC corresponding to an UL CC used to transmit a random access preamble or the third message, the corresponding MAC PDU includes a UE contention resolution identity control element, and this UE contention resolution identity control element is matched to the CCCH SDU transmitted through the third message (that is, the UE contention resolution identity control element corresponds to the identity of the UE, transmitted from the UE),
        (a) the UE considers the contention resolution procedure to be successful, and
        (b) sets the temporary C_RNTI used for the random access as C-RNTI.

The algorithms shown in Tables 2, 3, 4 and 5 may be used in a combined manner.

Now, a description will be given of a UE apparatus and an eNB apparatus for performing random access to the eNB as described above.

The UE apparatus and the eNB apparatus include an antenna, a processor, etc. according to device type. The following description is given, focusing on the structure of a processor for controlling the above-described operations.

Figure 2:
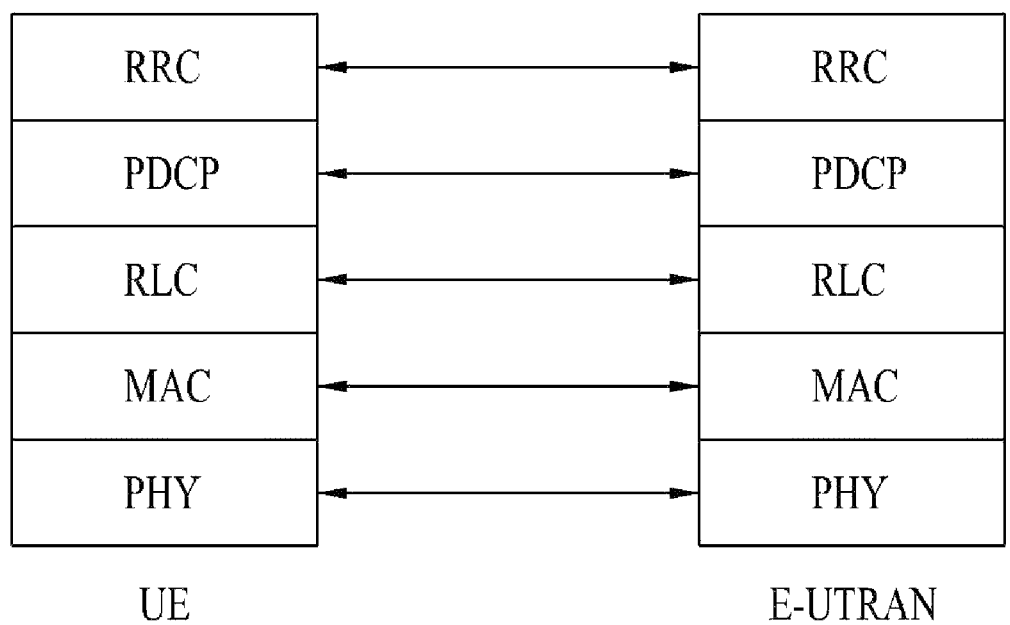
FIGS. 2 and 3 illustrate radio protocol layers.
Figure 3:
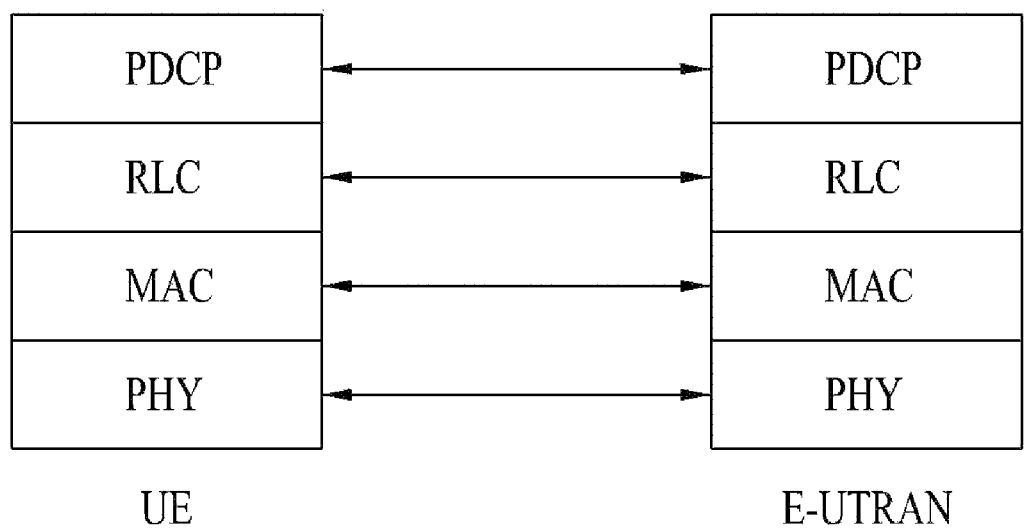
Figure 4:
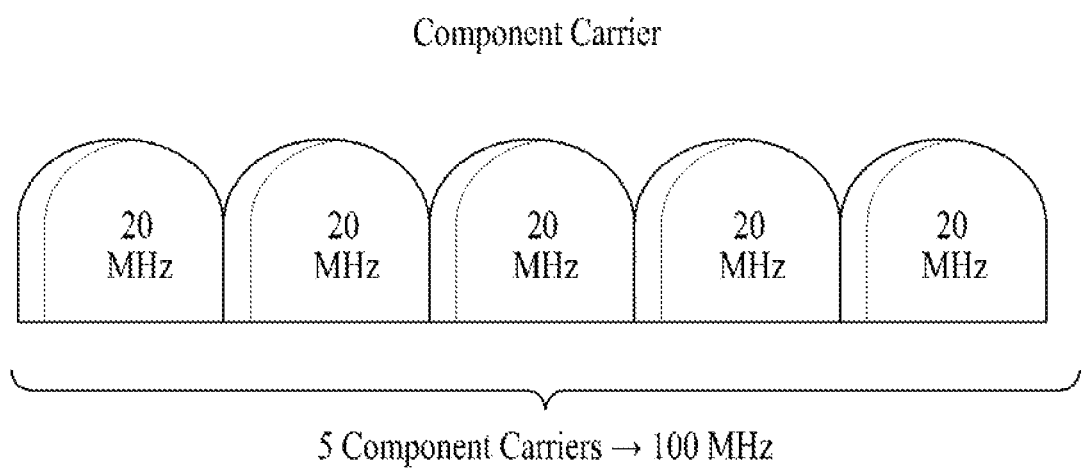
FIG. 4 is a view referred to for describing Carrier Aggregation (CA)
Figure 5:
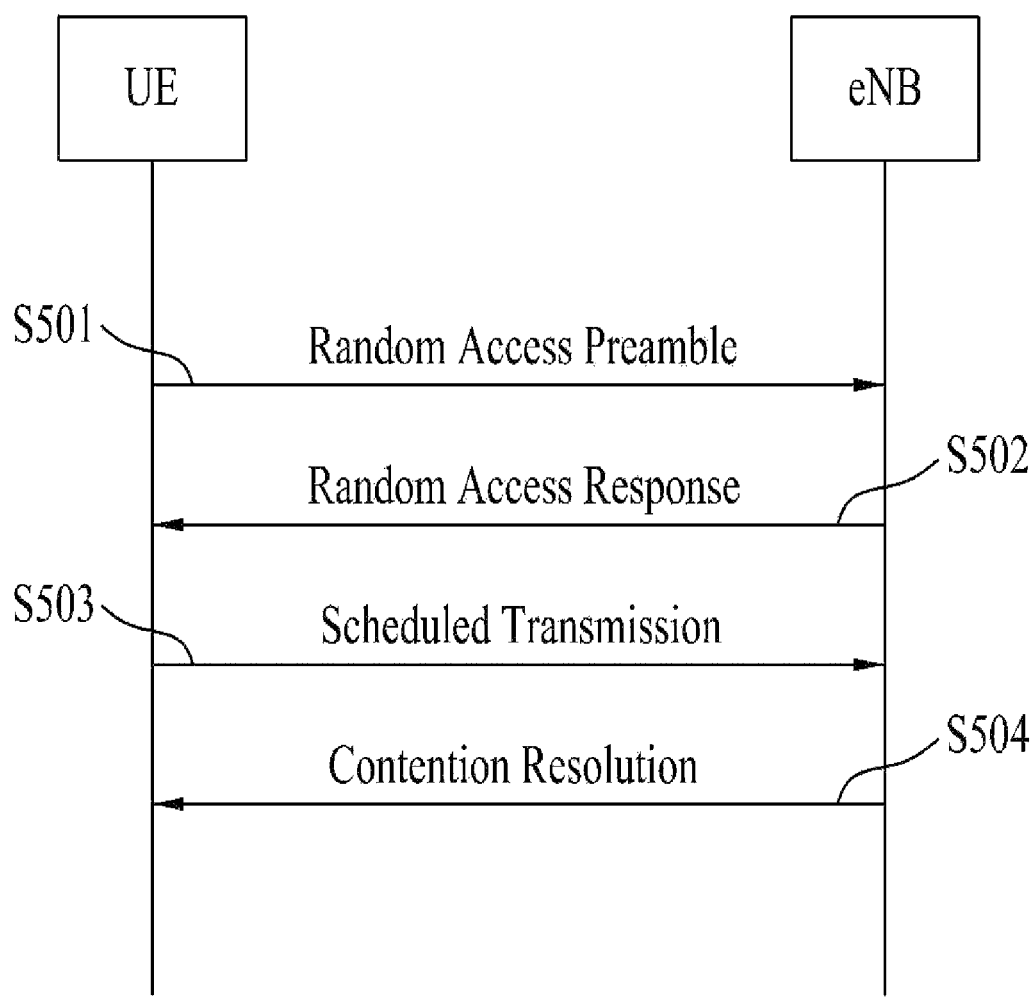
FIG. 5 is a diagram illustrating a signal flow for operations of a User Equipment (UE) and an evolved Node B (eNB) in a contention-based random access procedure.

The processors of the UE and the eNB may have the layer structures illustrated in FIGS. 2 and 3. In each embodiment of the present invention, the processors of the UE and the eNB have the following structures for use in a system to which CA is applied.

Figure 9:
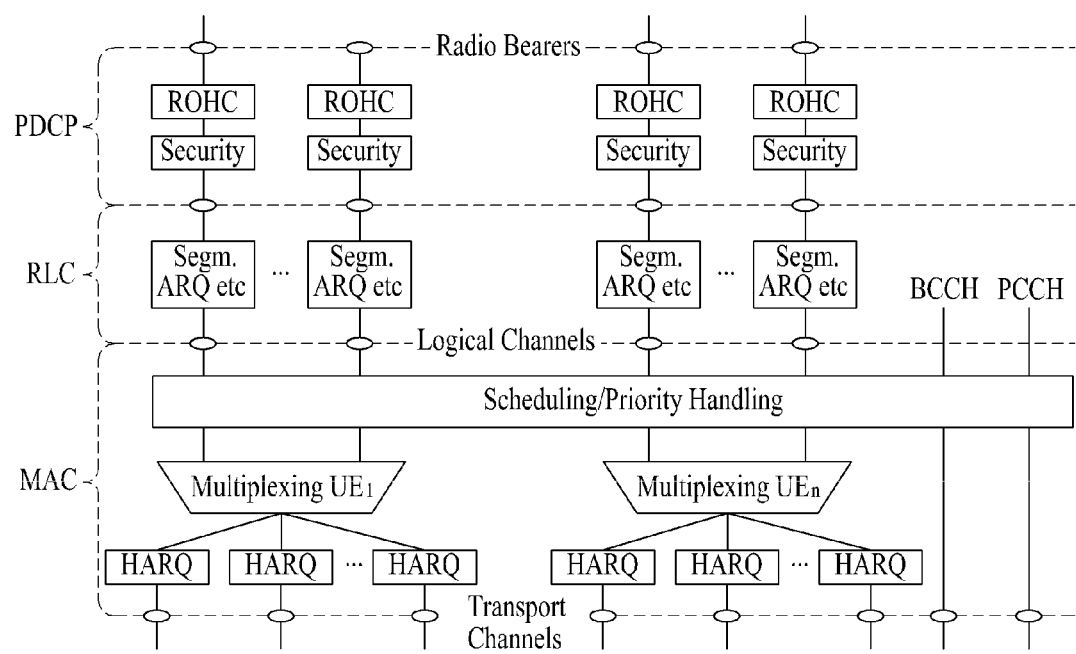
FIGS. 9 and 10 illustrate the structures of processors at the UE and eNB according to an embodiment of the present invention.
Figure 10:
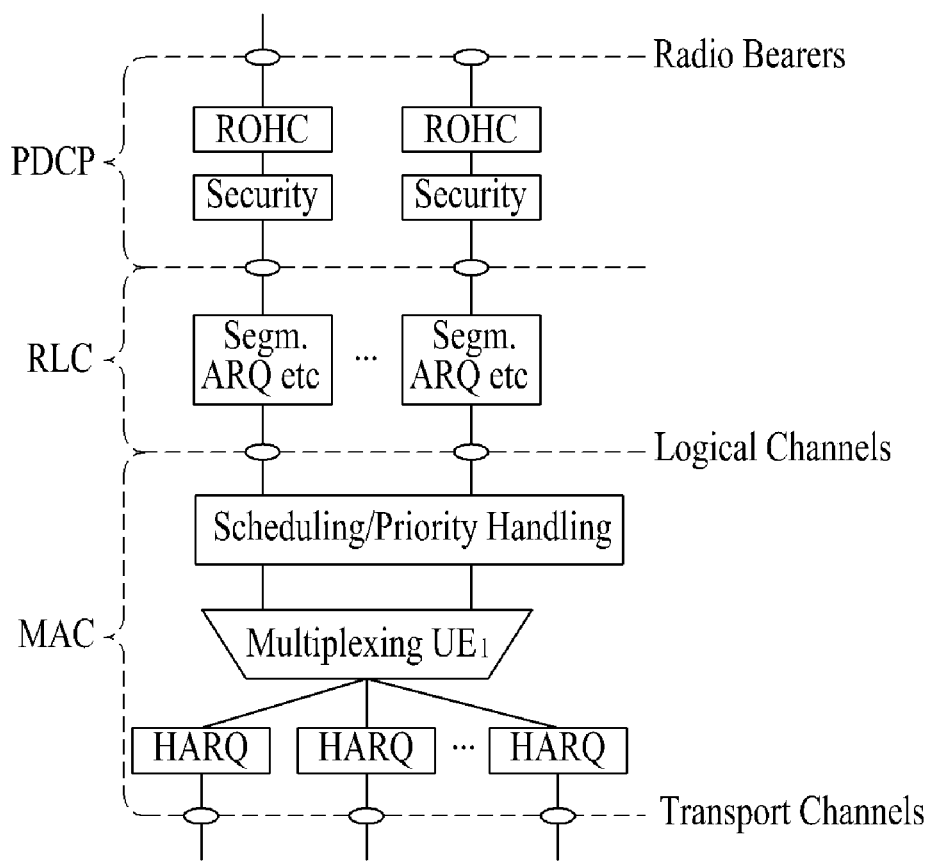

FIGS. 9 and 10 illustrate the structures of processors at the UE and the eNB according to an embodiment of the present invention.

Specifically, FIG. 9 illustrates the downlink L2 structure of the eNB for performing the afore-described method, and FIG. 10 illustrates the uplink L2 structure of the UE for performing the afore-described method.

The CA technology significantly affects the MAC layer at L2. For example, a system using CA uses a plurality of CCs and each HARQ entity manages one CC. Therefore, the MAC layers of the UE processor and the eNB processor should perform operations related to a plurality of HARQ entities in the embodiment of the present invention. In addition, since each HARQ entity processes a transport block, a plurality of transport blocks can be transmitted or received at the same time on a plurality of CCs in CA.

That is, MAC layer modules of the UE and the eNB include a plurality of HARQ entities, each taking charge of a CC in the embodiment of the present invention. As illustrated in FIG. 8, the MAC layer module of the eNB processor may include a multiplexing module for multiplexing a plurality of HARQ entities corresponding 1:1 to a plurality of CCs for each UE (e.g. UE1 or UE2) and a module for scheduling/priority handling for all UEs. As illustrated in FIG. 10, the MAC layer module of the UE may also include a plurality of HARQ entities respectively corresponding to a plurality of CCs, and may include a module for scheduling/priority handling for uplink resources.

The UE apparatus having the above L2 structure will be described in greater detail, from the viewpoint of the afore-described random access procedure.

The UE processor includes an RRC layer module for generating a logical channel signal for RRC connection establishment or reestablishment. For example, an RRC connection request message may be mapped to a CCCH and transmitted to the later-described MAC layer.

The MAC layer module may map the logical channel signal (e.g. the CCCH) for RRC connection establishment/reestablishment to a MAC PDU format and transmit the mapped logical channel signal to the physical layer over a transport channel. The transport channel may be transmitted using any of a plurality of HARQ entities. A physical layer module may map the transport channel signal to a physical channel (e.g. a PDSCH) and transmit the PDSCH to the eNB. In case of the above-described signal for RRC connection establishment/reestablishment, it may be transmitted to the eNB as a third message transmitted in a random access procedure. Meanwhile, first and second messages may be transmitted according to decision of the physical layer irrespective of HARQ entities in the random access procedure.

Meanwhile, the UE processor according to the embodiment of the present invention may be configured such that it does not consider an uplink grant signal received during a contention resolution procedure as a contention resolution message when the uplink grant signal is not received through a DL CC corresponding to a UL CC used to transmit a random access preamble or a third message. Specifically, a MAC layer of a UE processor according to an embodiment of the present invention may be configured to execute the contention resolution algorithms as shown in Tables 2, 3, 4 and 5. The algorithms of Tables 2, 3, 4 and 5 may be implemented in a MAC layer module in a software or hardware manner.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the above-described embodiments have been described, focusing on the 3GPP LTE system, the present invention is not limited thereto and can be used for various mobile communication systems using a combination of a plurality of component carriers.

What is claimed is:

1. A method for performing a random access procedure by a user equipment (UE) configured with a plurality of downlink component carriers (DL CCs) and a plurality of uplink component carriers (UL CCs), the method comprising:
    transmitting a random access preamble through one of the plurality of UL CCs;
    receiving a random access response message in response to the random access preamble;
    transmitting an identifier of the UE; and
    determining whether the random access procedure is successful according to whether a contention resolution message is received before a contention resolution timer expires,
    wherein when physical downlink control channel (PDCCH) information is received through a first DL CC, and the PDCCH information is indicated by the same identifier transmitted by the UE, the UE considers the PDCCH information as the contention resolution message, and
    wherein when the PDCCH information is received through another DL CC different from the first DL CC, the UE does not consider the PDCCH information as the contention resolution message even if the PDCCH information is indicated by the same identifier transmitted by the UE.

2. The method of claim 1, wherein the random access preamble is transmitted through a first UL CC among the plurality of UL CCs.

3. The method of claim 2, wherein:
    each UL CC is paired with a corresponding DL CC, and
    the first UL CC through which the random access preamble is transmitted is paired with the first DL CC through which the PDCCH information corresponding to the contention resolution message is received.

4. The method of claim 1, wherein the first DL CC is an only DL CC through which the PDCCH information corresponding to the contention resolution message can be received.

5. The method of claim 4, wherein when the PDCCH information is received through the another DL CC, the UE waits for the contention resolution message until the contention resolution timer expires.

6. The method of claim 1, wherein each of the plurality of UL CCs has a physical random access channel (PRACH) resource.

7. A non-transitory computer readable medium recorded thereon a program for executing by a processor of a user equipment (UE) the following method:
    transmitting a random access preamble through one of a plurality of uplink component carriers (UL CCs);
    receiving a random access response message in response to the random access preamble;

transmitting an identifier of the UE; and determining whether the random access procedure is successful according to whether a contention resolution message is received before a contention resolution timer expires, wherein when physical downlink control channel (PDCCH) information is received through a first downlink component carriers (DL CC), and the PDCCH information is indicated by the same identifier transmitted by the UE, the UE considers the PDCCH information as the contention resolution message, and wherein when the PDCCH information is received through another DL CC different from the first DL CC, the UE does not consider the PDCCH information as the contention resolution message even if the PDCCH information is indicated by the same identifier transmitted by the UE.

8. A user equipment (UE) configured with a plurality of downlink component carriers (DL CCs) and a plurality of uplink component carriers (UL CCs), the UE comprising:

a transmitter to transmit a random access preamble through one of the plurality of UL CCs, and to transmit an identifier of the UE;

a receiver to receive a random access response message in response to the random access preamble; and a processor to determine whether the random access procedure is successful according to whether a contention resolution message is received before a contention resolution timer expires, wherein when physical downlink control channel (PDCCH) information is received through a first DL CC, and the PDCCH information is indicated by the same identifier transmitted by the UE, the processor considers the PDCCH information as the contention resolution message, and wherein when the PDCCH information is received through another DL CC different from the first DL CC, the processor does not consider the PDCCH information as the contention resolution message even if the PDCCH information is indicated by the same identifier transmitted by the UE.

9. The UE of claim 8, wherein the random access preamble is transmitted through a first UL CC among the plurality of UL CCs.

10. The UE of claim 9, wherein:

each UL CC is paired with a corresponding DL CC, and the first UL CC through which the random access preamble is transmitted is paired with the first DL CC through which the PDCCH information corresponding to the contention resolution message is received.

11. The UE of claim 9, wherein the first DL CC is an only DL CC through which the PDCCH information corresponding to the contention resolution message can be received.

12. The UE of claim 11, wherein when the PDCCH information is received through the another DL CC, the UE waits for the contention resolution message until the contention resolution timer expires.

13. The UE of claim 8, wherein each of the plurality of UL CCs has a physical random access channel (PRACH) resource.

\* \* \* \* \*